US011110839B2

(12) United States Patent
Subat et al.

(10) Patent No.: US 11,110,839 B2
(45) Date of Patent: Sep. 7, 2021

(54) LOUDSPEAKERS WITH 3D PRINTED LATTICE GRILLES

(71) Applicant: Bose Corporation, Framingham, MA (US)

(72) Inventors: Bradford Kyle Subat, Northborough, MA (US); Carl J. Price, Marlborough, MA (US)

(73) Assignee: Bose Corporation, Framingham, MA (US)

( * ) Notice: Subject to any disclaimer, the term of this patent is extended or adjusted under 35 U.S.C. 154(b) by 259 days.

(21) Appl. No.: 16/003,663

(22) Filed: Jun. 8, 2018

(65) Prior Publication Data

US 2019/0375324 A1    Dec. 12, 2019

(51) Int. Cl.
*B60N 2/879* (2018.01)
*B60R 11/02* (2006.01)
*H04R 1/02* (2006.01)
*B60R 11/00* (2006.01)

(52) U.S. Cl.
CPC .......... *B60N 2/879* (2018.02); *B60R 11/0217* (2013.01); *H04R 1/02* (2013.01); *B60R 2011/0017* (2013.01); *H04R 2499/13* (2013.01)

(58) Field of Classification Search
CPC ........ B60N 2/803; B60N 2/806; B60N 2/879; B60R 11/0217; B60R 2011/0017; H04R 1/02; H04R 1/023; H04R 1/026; H04R 1/28; H04R 2201/02; H04R 2201/021; H04R 2201/029; H04R 2499/13
See application file for complete search history.

(56) References Cited

U.S. PATENT DOCUMENTS

| 9,403,454 B2 | 8/2016 | Subat et al. | |
| 9,682,641 B1 | 6/2017 | Subat et al. | |
| 2004/0026585 A1* | 2/2004 | Hutt | B60R 11/0223 248/309.1 |
| 2014/0270322 A1* | 9/2014 | Silverstein | H04R 1/023 381/391 |

(Continued)

FOREIGN PATENT DOCUMENTS

| EP | 3100904 A1 | 12/2016 |
| EP | 3007460 B1 | 7/2017 |

(Continued)

OTHER PUBLICATIONS

Kabaria, Hardik et al., "Lattices", dated Feb. 12, 2018, retrieved from https://www.carbon3d.com/softwareteam/lattices/, 7 pages.

(Continued)

*Primary Examiner* — Fan S Tsang
*Assistant Examiner* — Daniel R Sellers
(74) *Attorney, Agent, or Firm* — Bose Corporation

(57) ABSTRACT

A vehicle headrest includes an electro-acoustic transducer and an acoustic enclosure. The acoustic enclosure defines an acoustic chamber. The acoustic enclosure supports the electro-acoustic transducer such that a rear radiating surface of the electro-acoustic transducer radiates acoustic energy into the acoustic chamber. A cushion member is coupled to the acoustic enclosure for supporting a user's head. A grille member overlies a front radiating surface of the electro-acoustic transducer. The grille member is formed of a 3D printed lattice.

20 Claims, 17 Drawing Sheets

(56) References Cited

U.S. PATENT DOCUMENTS

| | | |
|---|---|---|
| 2015/0021968 A1 | 1/2015 | Subat |
| 2015/0201260 A1 | 7/2015 | Oswald et al. |
| 2016/0137106 A1* | 5/2016 | Subat ................. H04R 1/086 381/389 |
| 2016/0255430 A1* | 9/2016 | Fujita ............. B60R 11/0217 381/333 |
| 2017/0072869 A1* | 3/2017 | Ito ..................... B60N 2/879 |
| 2018/0184183 A1* | 6/2018 | Kaplan ............. H04R 1/023 |
| 2018/0264718 A1* | 9/2018 | McCluskey ......... B33Y 80/00 |

FOREIGN PATENT DOCUMENTS

| | | |
|---|---|---|
| GB | 2224178 A | 4/1990 |
| JP | 2009291454 A | 12/2009 |
| JP | 2015100026 A | 5/2015 |
| JP | 6310682 B2 | 4/2018 |

OTHER PUBLICATIONS

International Search Report and Written Opinion dated Sep. 20, 2019 for PCT/US2019/035762.

\* cited by examiner

LOUDSPEAKERS WITH 3D PRINTED LATTICE GRILLES

BACKGROUND

This disclosure relates to loudspeakers with 3D printed lattice grilles.

SUMMARY

All examples and features mentioned below can be combined in any technically possible way.

In one aspect, a vehicle headrest includes an electro-acoustic transducer and an acoustic enclosure. The acoustic enclosure defines an acoustic chamber. The acoustic enclosure supports the electro-acoustic transducer such that a rear radiating surface of the electro-acoustic transducer radiates acoustic energy into the acoustic chamber. A cushion member is coupled to the acoustic enclosure for supporting a user's head. A grille member overlies a front radiating surface of the electro-acoustic transducer. The grille member is formed of a 3D printed lattice.

Implementations may include one of the following features, or any combination thereof.

In some implementations, wherein the acoustic enclosure includes a rear cover that defines a rear surface of the headrest, and a baffle member that supports the electro-acoustic transducer.

In certain implementations, the baffle defines plurality of recesses.

In some examples, the cushion member includes a cushion layer for supporting a user's head, and a mounting member comprising a plurality of features for engaging the recesses in the baffle, thereby to couple the cushion member to the baffle.

In certain examples, the 3D printed lattice has a non-linear load-compression profile.

In some cases, the 3D printed lattice has a lattice geometry that is tuned to acoustically mask certain areas of the grille member.

In certain cases, the 3D printed lattice has a lattice geometry that at least partially defines an acoustic channel in the grille member.

In some implementations, the vehicle headrest includes an acoustic channel that is coupled to the grille member. The acoustic channel is defined, at least in part, by a continuous, contoured plane that is formed integrally with the 3D printed lattice in a 3D printing process.

In certain implementations, the vehicle headrest includes a first coupling member that is supported by the grille member for coupling the grille member to the acoustic enclosure.

In some examples, the coupling member is formed integrally with the 3D printed lattice.

In certain examples, the 3D printed lattice defines a recess for receiving the coupling member.

In some cases, the 3D printed lattice has a lattice geometry that is tuned to have an energy absorption that is substantially the same as that of the cushion member.

In certain cases, the vehicle headrest includes a second coupling member that is supported by the acoustic enclosure for engaging the first coupling member, thereby to couple the grille member to the acoustic enclosure.

In some implementations, the first and second coupling members include hooks that interlock to couple the first and second coupling members to each other.

In certain implementations, the 3D lattice defines a recess for receiving a first end of a Christmas tree fastener. The acoustic enclosure defines an aperture for receiving a second, opposite end of the Christmas tree fastener, thereby to couple the grille member to the acoustic enclosure.

In some examples, the vehicle headrest includes a support rod coupled to the acoustic enclosure for securing the headrest to a seatback.

In certain examples, the grille member is disposed adjacent the cushion member such that the grille member and cushion member together define a front surface contour of the headrest.

In another aspect, a loudspeaker includes an electro-acoustic transducer and an acoustic enclosure. The acoustic enclosure defines an acoustic chamber. The acoustic enclosure supports the electro-acoustic transducer such that a rear radiating surface of the electro-acoustic transducer radiates acoustic energy into the acoustic chamber. A grille member overlies a front radiating surface of the electro-acoustic transducer. The grille member is formed of a 3D printed lattice.

Implementations may include one of the above and/or below features, or any combination thereof.

Various examples may include an acoustic channel, and in certain examples the 3D printed lattice at least partially defines the acoustic channel for diverting acoustic radiation from the front radiating surface of the electro-acoustic transducer toward a desired direction.

In some implementations, the 3D printed lattice is formed of elastomeric polyurethane.

In certain implementations, the 3D printed lattice includes a 3D grid of interconnected spokes of polymer that define a network of open cells.

In some examples, the 3D printed lattice has a non-linear load-compression profile.

In certain examples, the 3D printed lattice has a lattice geometry that is tuned to acoustically mask certain areas of the grille member.

In some cases, the 3D printed lattice has a lattice geometry that at least partially defines an acoustic channel in the grille member.

DETAILED DESCRIPTION

This disclosure is based, at least in part, on the realization that it may be beneficial to utilize a 3D printed lattice as grille for a loudspeaker. The use of a 3D printed lattice as a loudspeaker grille may be particularly beneficial for applications in which the loudspeaker is likely to come into contact with a human body, such as when it is incorporated in a headrest (e.g., a motor vehicle headrest). In such implementations, the use of a 3D printed lattice can provide protection to an underlying electro-acoustic transducer, while also providing a compliant surface against which a user can comfortably rest their head and which satisfies safety requirements for a motor vehicle headrest.

Figure 1A:
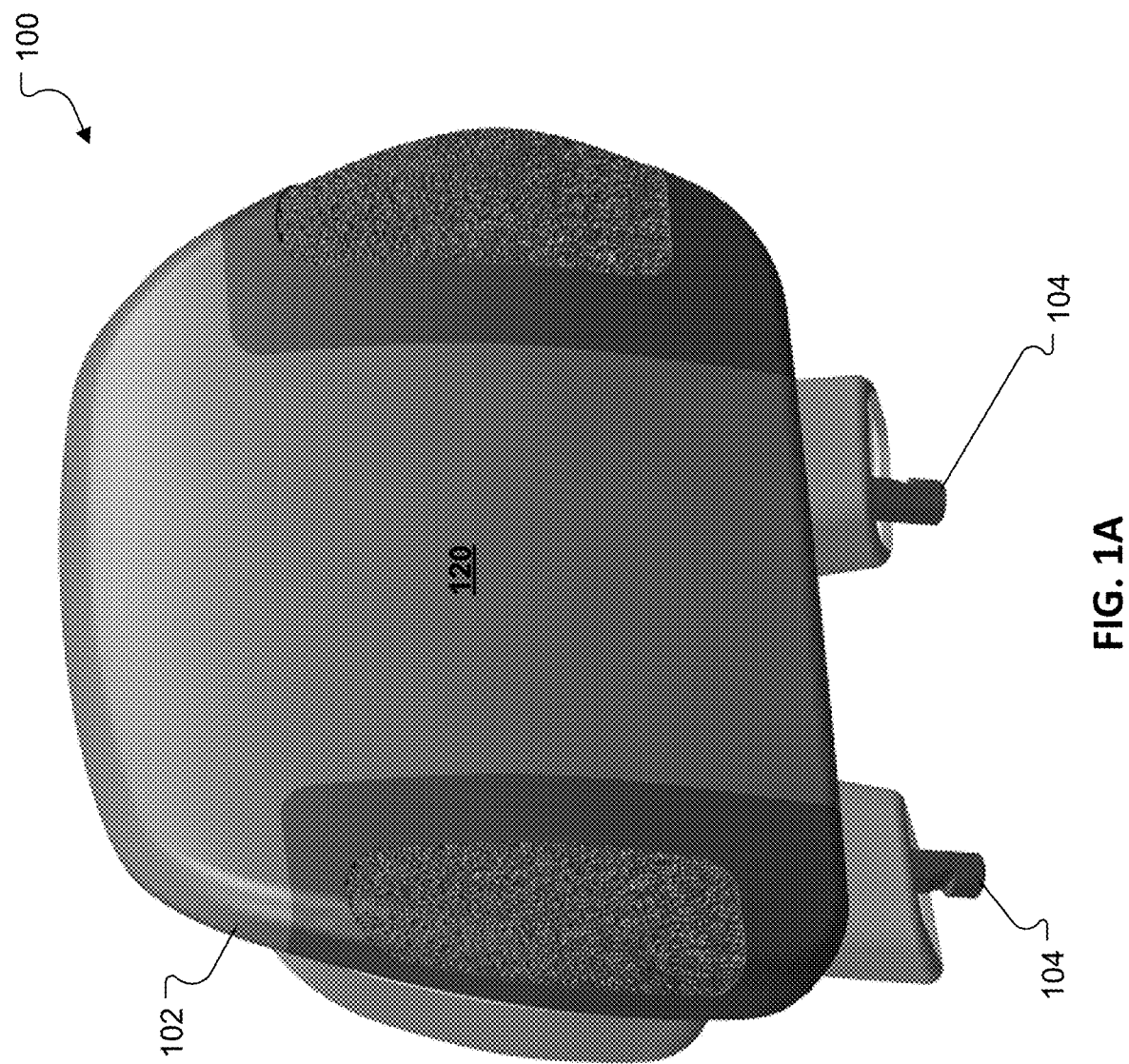
FIG. 1A is front perspective view of a vehicle headrest with an integrated loudspeaker.
Figure 1B:
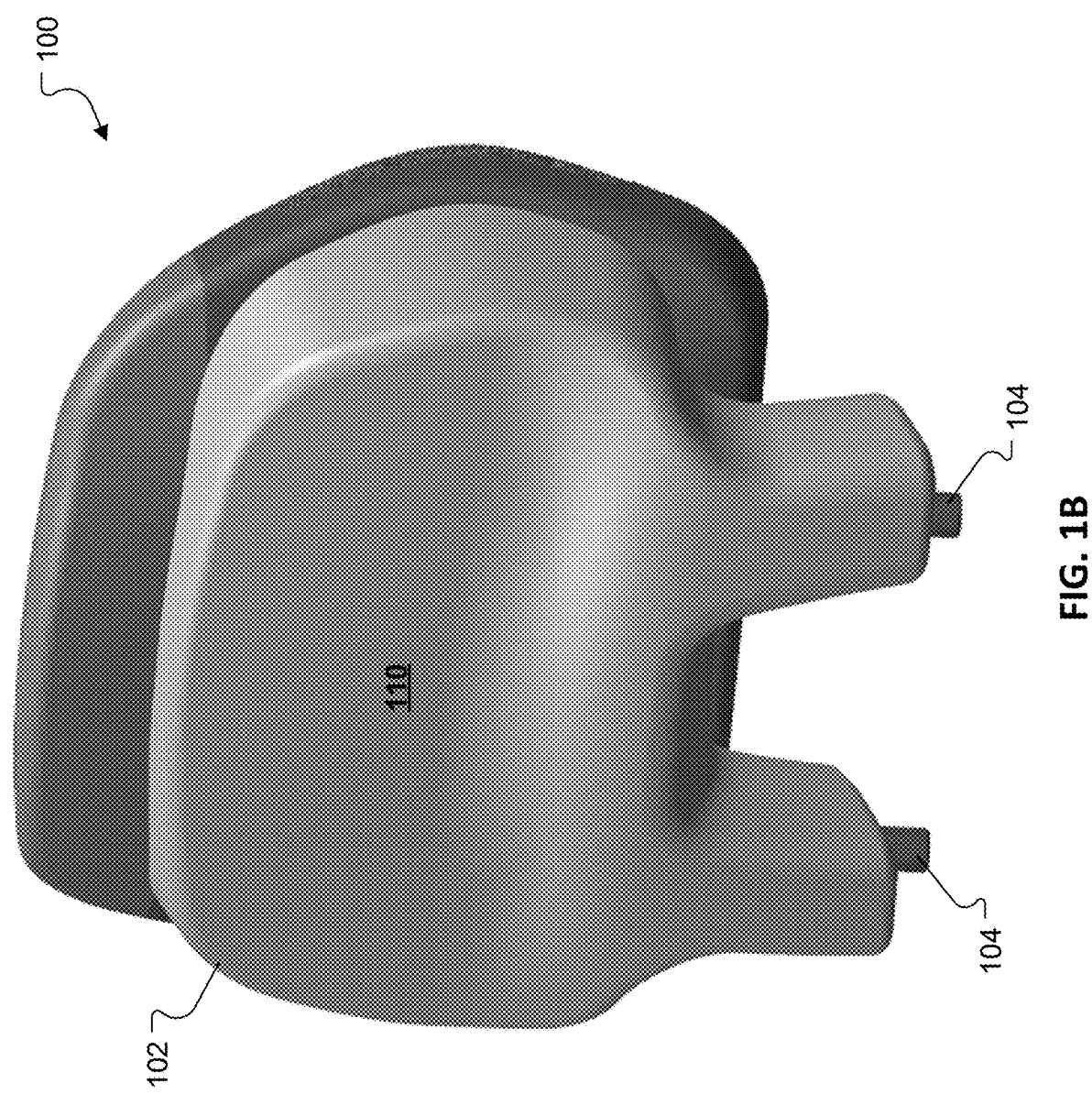
FIG. 1B is a rear perspective view of the vehicle headrest of FIG. 1A.

Referring to FIGS. 1A & 1B, an exemplary vehicle headrest 100 includes a main body portion 102 for supporting the back of a user's head; and one or more (two shown) support rods 104 for detachably mounting the headrest 100 to a seat back.

Figure 2A:
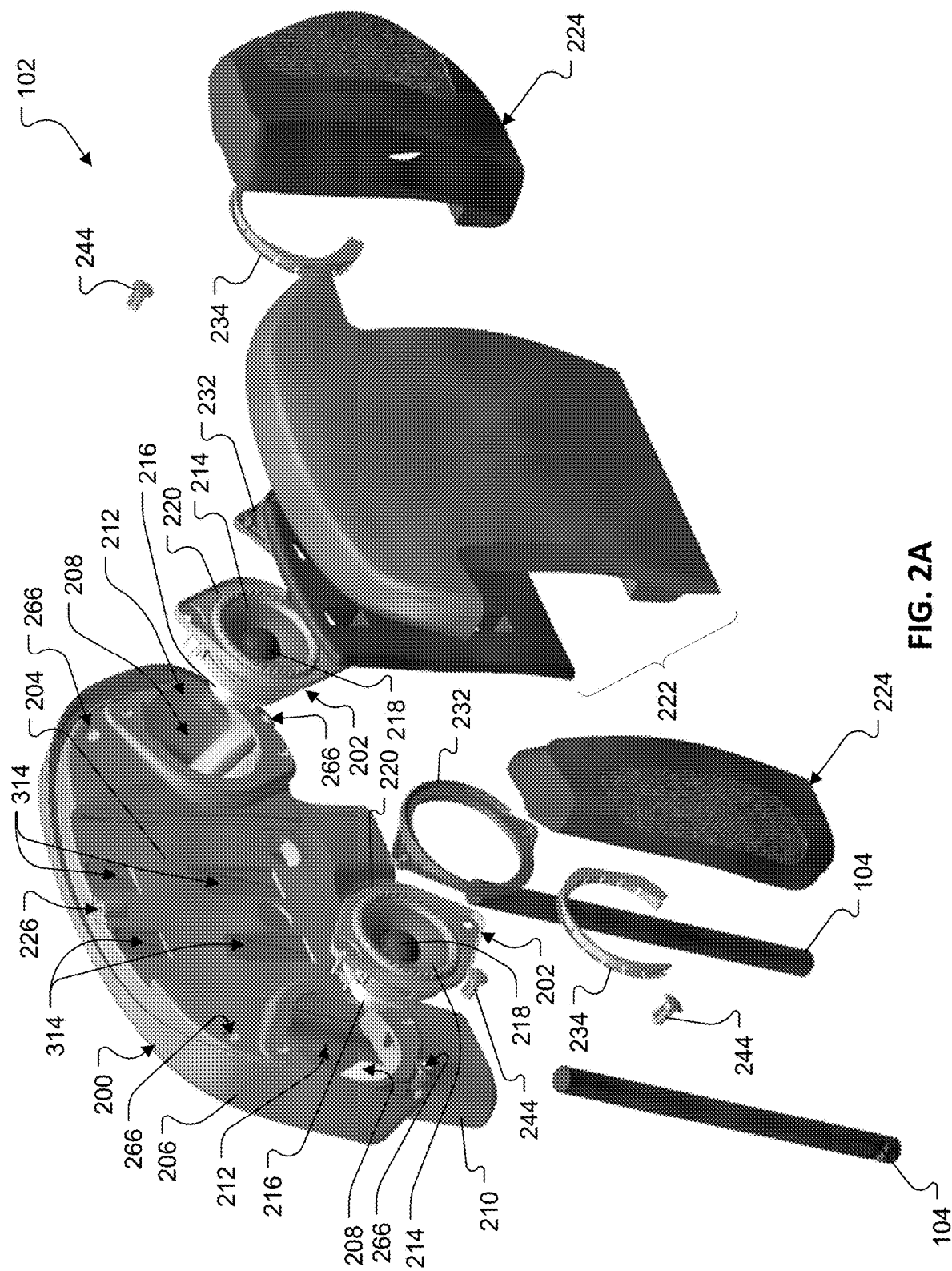
FIG. 2A is an exploded front perspective view of the vehicle headrest of FIG. 1A.
Figure 2B:
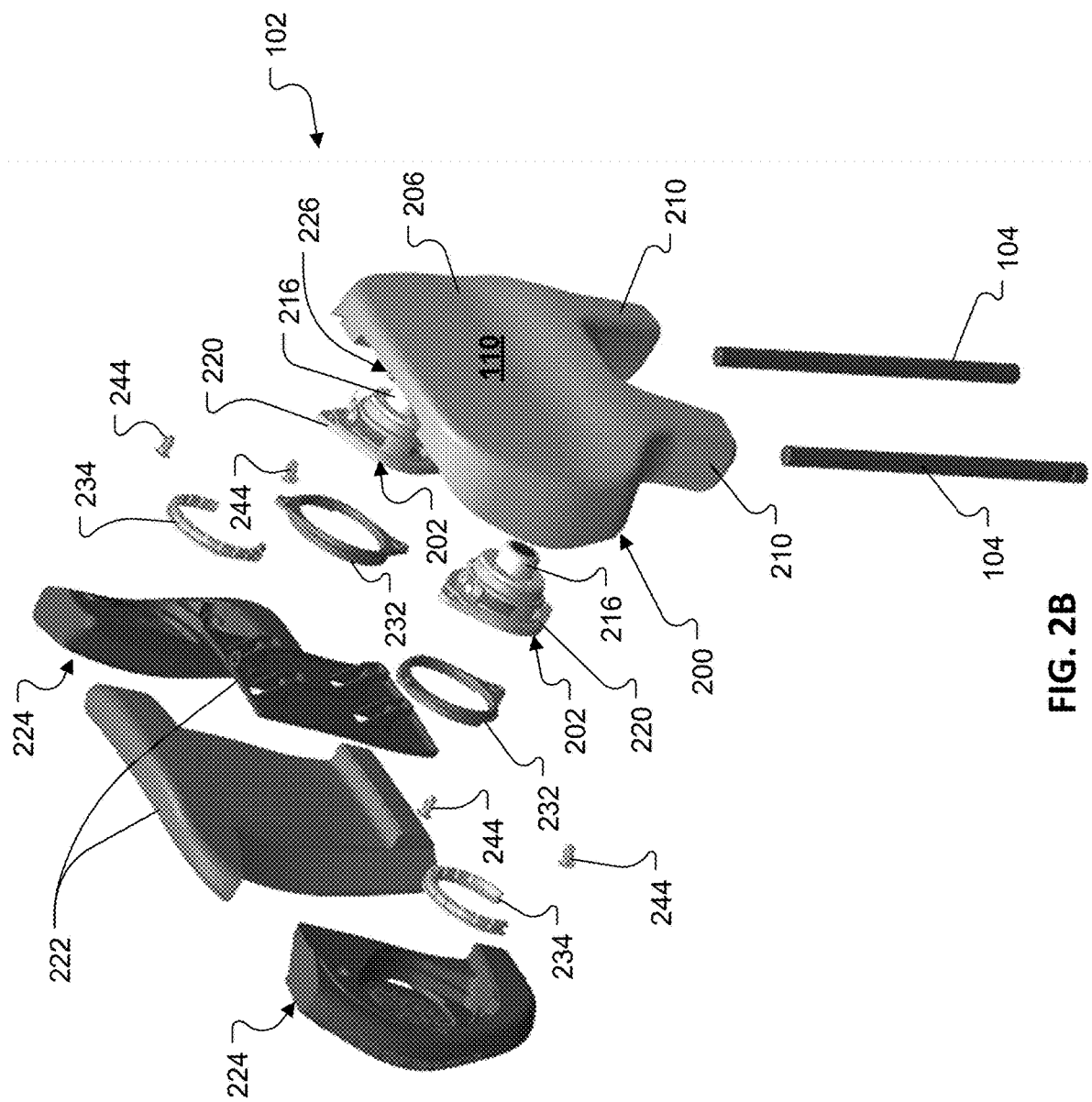
FIG. 2B is an exploded rear perspective view of the vehicle headrest of FIG. 1A.

With reference to FIGS. 2A & 2B, the main body portion 102 includes a core assembly 200 which supports a plurality of electro-acoustic transducers 202. The core assembly 200 includes a baffle member 204 and a back cover 206 that is coupled to the baffle member 204 to define an acoustic enclosure with one or more acoustic chambers 208 (see also FIG. 7) therebetween. The baffle member 204 and back cover 206 can be formed from plastic, such as acrylonitrile butadiene styrene (ABS), polycarbonate (PC), or a polyphenylene ether (PPE)+polystyrene (PS) blend, in an injection molding process. The baffle member 204 and the back cover 206 may be coupled together with mechanical fasteners (e.g., screws), adhesive, welding (e.g., ultrasonic welding, or combinations thereof.

The back cover 206 defines a rear surface 110 (FIGS. 1B & 2B) of the headrest 100. The back cover 206 also defines sockets 210 for receiving a distal end portion of one of the support rods 104. The distal end portions of the support rods 104 are pushed up into the sockets 210. The connection between the sockets 210 and the support rods 104 can be a friction fit. Alternatively or additionally, the sockets 210 and the support rods 104 can include interlocking features that help to secure the rods 104 within the sockets 210. The sockets 210 are configured to provide sufficient structural overlap with the support rods 104 such that impact forces that hit the headrest are transmitted into the bars. Furthermore, while an implementation has been described in which the sockets 210 are defined by the back cover 206, in some cases, the sockets 210 may be formed separately from the back cover 206 and subsequently secured thereto (e.g., via adhesive or hardware). For example, in some implementations, the sockets 210 may be defined by the baffle member 204. In some implementations, the baffle member may be comprised of more than one piece.

The baffle member 204 defines a pair of holes 212 for accommodating the electro-acoustic transducers 202. Each of the electro-acoustic transducers 202 includes a diaphragm 214, a drive unit 216 (e.g., a voice coil motor) arranged along a rear radiating surface of the diaphragm 214, a dust cap 218 arranged centrally along a front radiating surface of the diaphragm 214, and a frame 220 for supporting the drive unit 216 and the diaphragm 214. The frames 220 mount straight to the baffle member 204, e.g., with screws, such that the rear radiating surfaces of the diaphragms 214 radiate acoustic energy into the one or more acoustic chambers 208. In some cases, the one or more acoustic chambers 208 may include a separate acoustic chamber for each electro-acoustic transducer, such that the electro-acoustic transducers radiate acoustic energy into separate, respective acoustic chambers that are acoustically isolated from each other.

In the illustrated implementation, the electro-acoustic transducers 202 are mounted such that they are forward firing; i.e., the motion axes of the electro-acoustic transducers are substantially normal to the front surface of the headrest, against which the user's head rests, and are substantially parallel to each other. In the forward firing configuration, the front radiating surfaces of the electro-acoustic transducers 202 are arranged radiate acoustic energy in a direction that his substantially normal to the front surface of the headrest 100. Still, in other implementations, the electro-acoustic transducers may be arranged to fire off at an angle, e.g., up to 40 degrees.

In some cases, wiring may be routed into the acoustic chambers 208 through one or more of the support rods 104. Alternatively, wiring might also be routed through a third, center post (not shown) rather than inside the support rods. In some cases, one or more slots may be formed in the acoustic enclosure in order to pass electrical wiring into the acoustic chambers 208 for driving the electro-acoustic transducers 202. Such slots can be sealed during assembly.

Figure 3A:
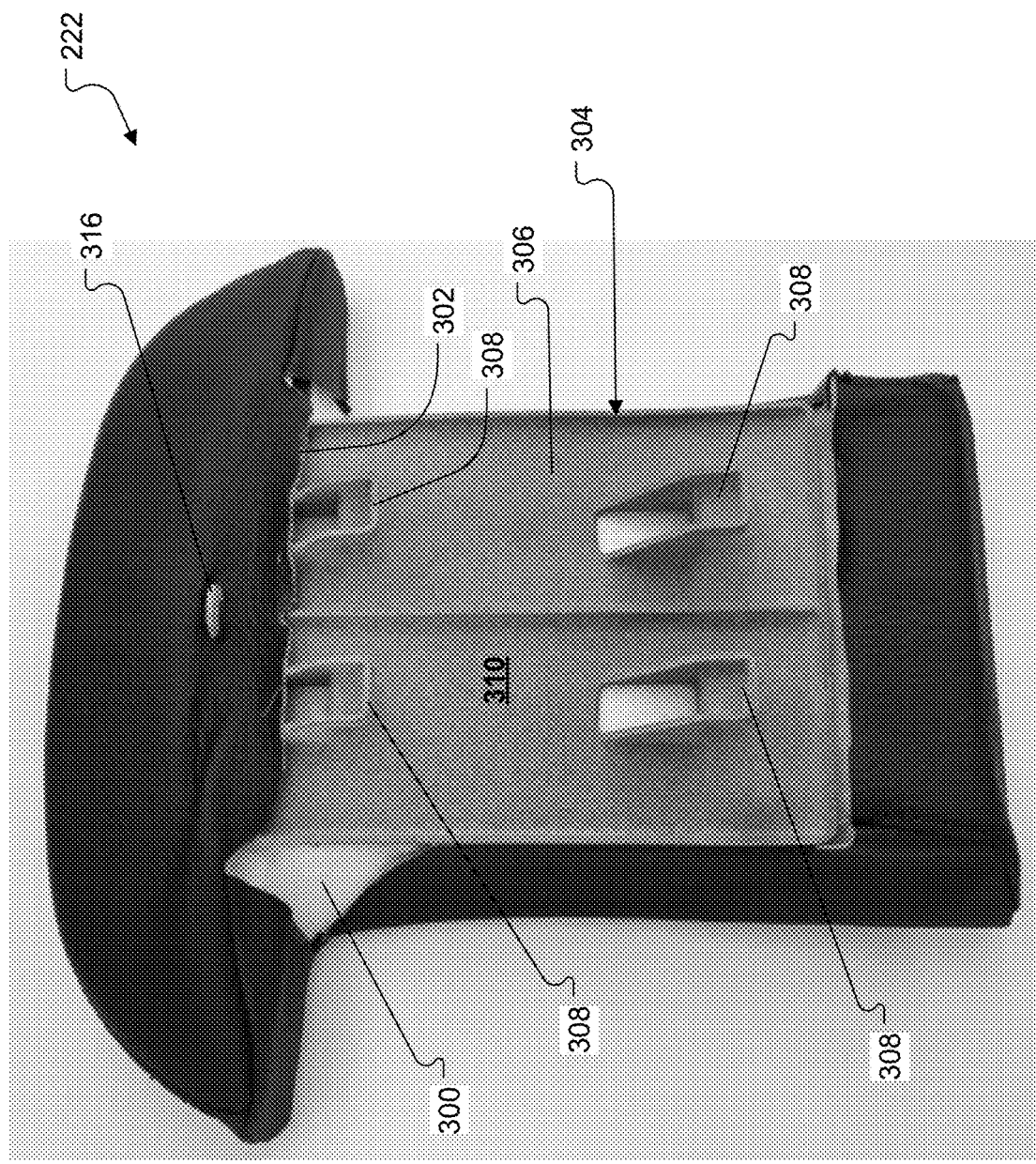
FIG. 3A is a rear view of a cushion member from the vehicle headrest of FIG. 1A.

The main body portion 102 also includes a cushion member 222 and a pair of grille members 224, which are coupled to the core assembly 200. Referring to FIG. 3A, the cushion member 222 includes a cushion layer 300, a cover layer 302, and a mounting member 304.

The cushion layer 300 can include molded foam (e.g., polyurethane). It may be desirable to utilize a cushion material that provides high energy absorption for cushioning. For example, the cushion layer 300 can comprise a material having an energy absorption that meets automotive head restraint safety requirements; in one case, safety requirements dictate that for a spherical mass of 6.8 kg traveling at 24.1 km/h, the deceleration must not exceed 80 g's continuously for more than 3 milliseconds. (See Federal Motor Vehicle Safety Standard No. 202, Head Restraints (FMVSS No. 202, at S4.2.5 and S5.2.5)). It may also be desirable to utilize a cushion material (e.g., a foam material) that provides for high acoustic damping to help acoustically isolate the electro-acoustic transducers 202. The cover layer 302 can, for example, be a type of fabric capable of being drawn around the cushion layer 300.

Figure 3B:
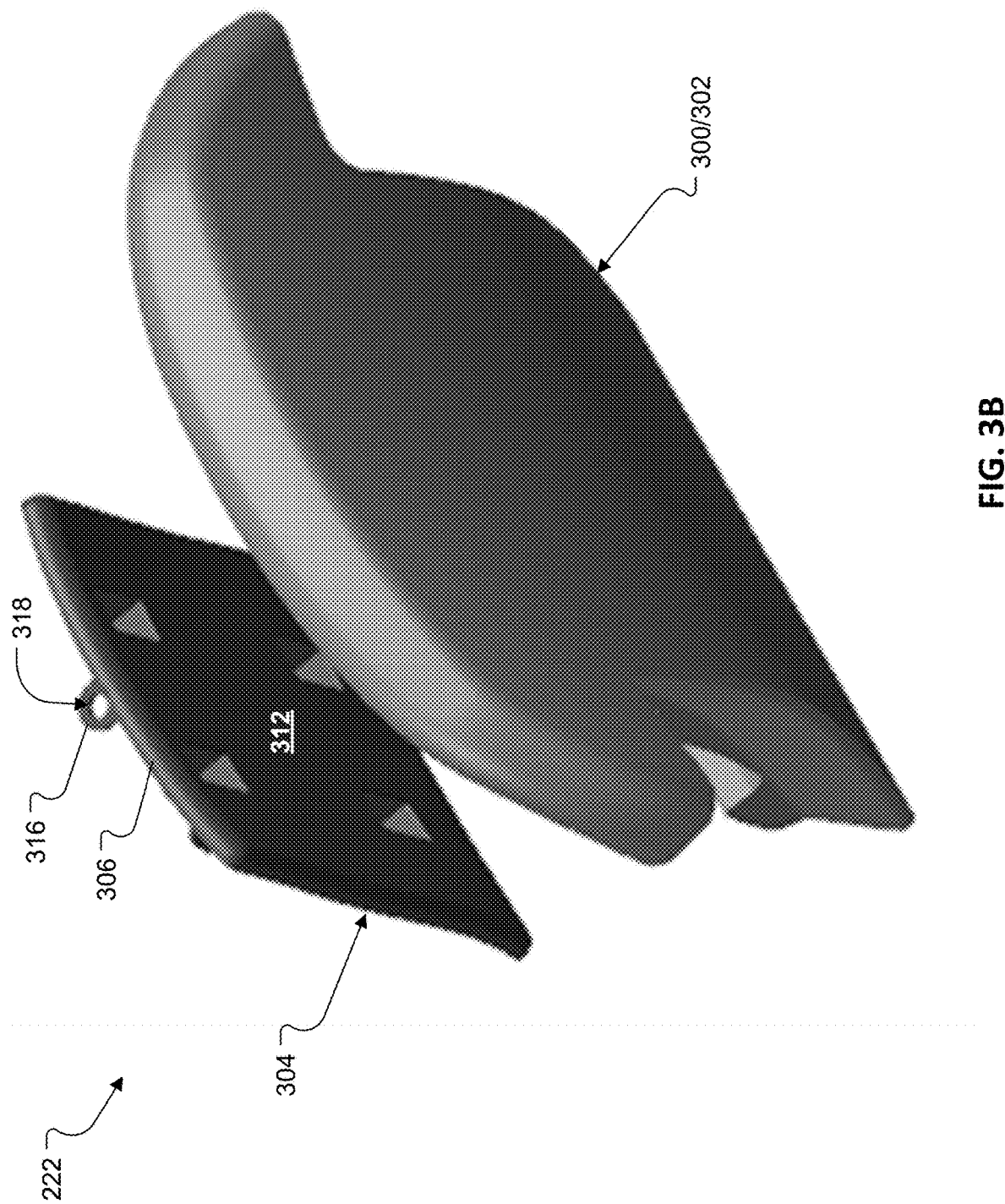
FIG. 3B is an exploded front perspective view of the cushion member of FIG. 3A.
Figure 3C:
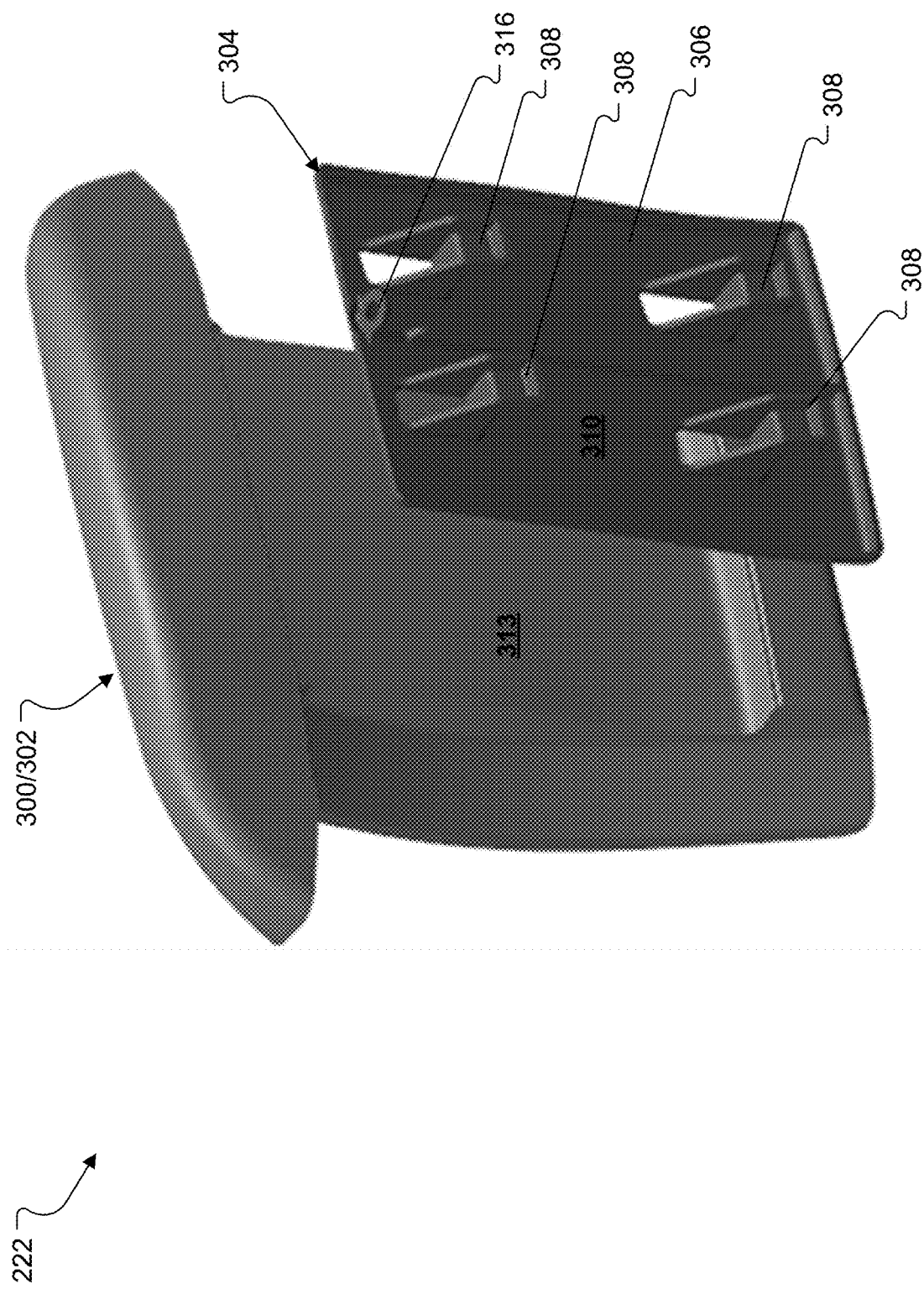
FIG. 3C is an exploded rear perspective view of the cushion member of FIG. 3A.

The mounting member 304 includes a mounting plate 306 and a plurality of hooks 308 that extend outwardly from a rear surface 310 of the mounting plate 306. A front surface 312 (FIG. 3B) of the mounting plate 306 is secured to a rear surface 313 (FIG. 3C) of the cushion layer 300, e.g., with fasteners and/or adhesive. Alternatively or additionally, in some implementations, the cushion member may be bonded to the mounting member in an overmolding process, i.e., the cushion layer 300 may be molded directly on the mounting member. The cushion member 222 is then secured to the core assembly 200 by hooking the hooks 308 into corresponding recesses 314 (FIG. 2A) formed in the baffle member 204. With the hooks 308 hooked into the recesses 314, a tab 316 on the mounting member 304 overlies a mounting hole 226 (FIG. 2A) in the baffle member 204. A fastener can then be passed through an opening 318 in the tab 316 and into the mounting 226 to secure the tab 316 to the baffle member 204. In some implementations, the tab can be eliminated if the snaps are self-locking. The mounting member 304 can be formed of a rigid material, such as a rigid polymer or metal and may be formed in a molding and/or machining process. Still, other mechanical fastening methods for attaching the cushion member to the core assembly are contemplated.

Referring again to FIGS. 2A & 2B, the grille members 224 are disposed on either side of the cushion member 222 and overlie the electro-acoustic transducers 202. The grille members 224 are secured to the core assembly 200 via a pair of couplings. The couplings help to ensure a good acoustic seal between the grille members 224 and the electro-acoustic transducers 202.

Each coupling includes a first coupling member 232 that is secured to the baffle member 204, and a second coupling member 234 that is secured to a corresponding one of the grille members 224. The first and second coupling members 232, 234 include interlocking features that allow them to be coupled together, thereby to secure the grille members 224 to the baffle member 204.

Figure 4A:
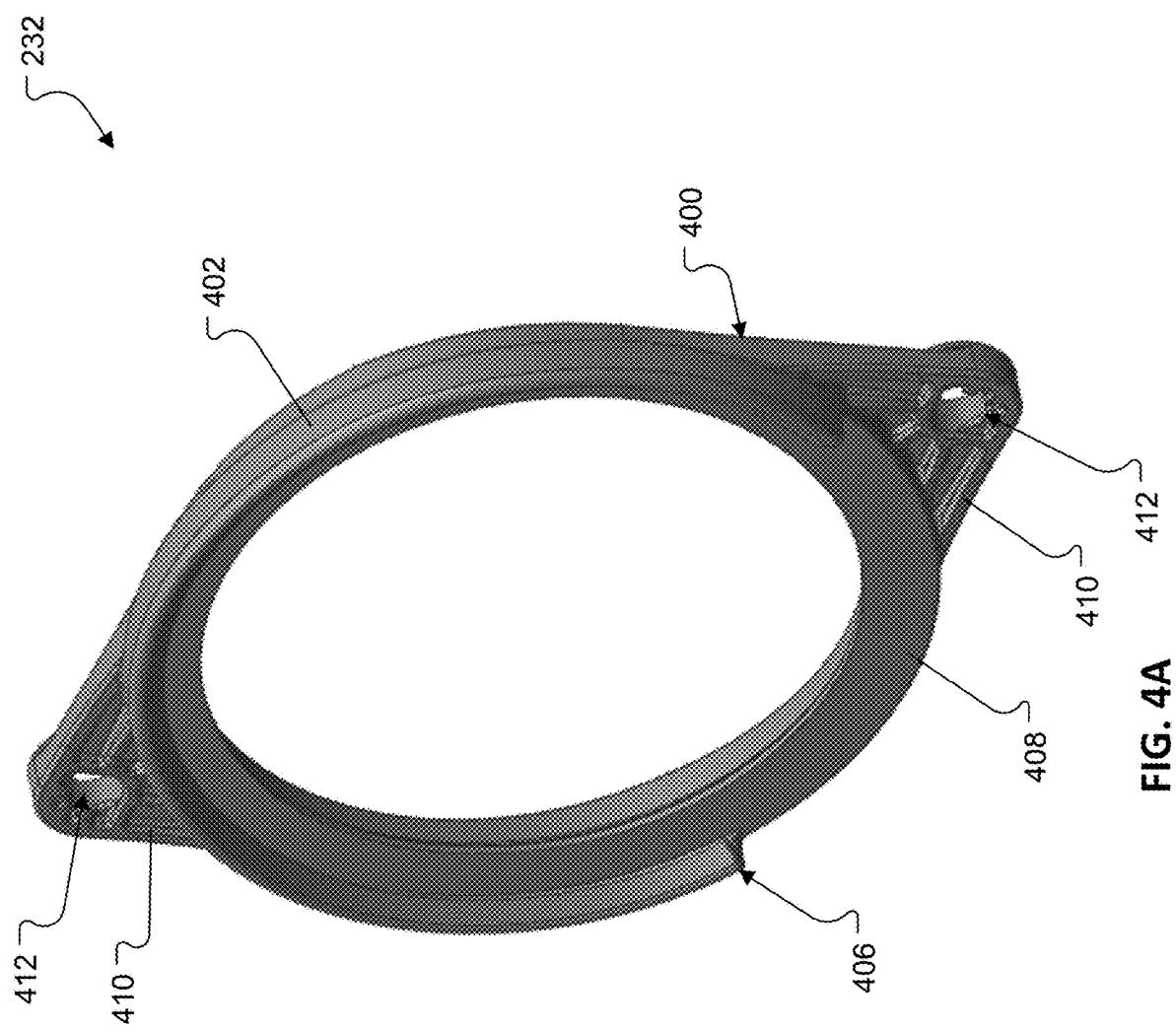
FIG. 4A is a perspective view of a coupling member from the vehicle headrest of FIG. 1A.
Figure 4B:
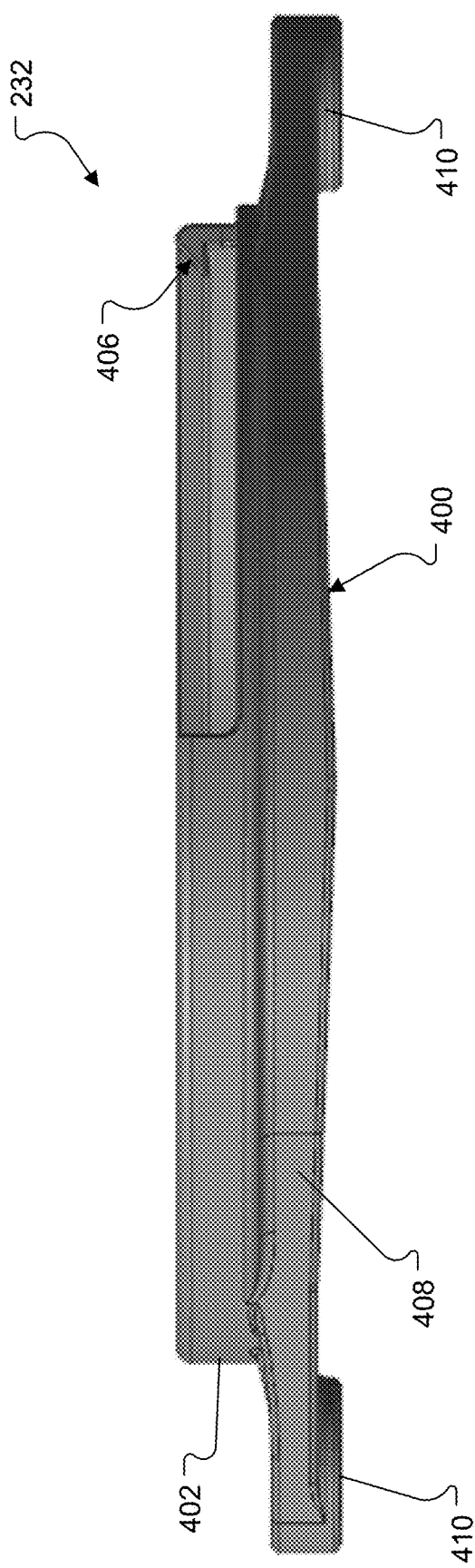
FIG. 4B is a side view of the coupling member of FIG. 4A.

With reference to FIGS. 4A & 4B, the first coupling member 232 includes a base 400 and wall 402 that extends outwardly from the base 400 and terminates at a hooked end 406. In the illustrated example, the base 400 generally conforms to the shape of the frame 220 (FIG. 2A) of the electro-acoustic transducer 202. The base 400 includes a ring-shaped body 408 that is configured to circumferentially surround the diaphragm 214 of a corresponding one of the electro-acoustic transducers 202. The base 400 also includes a pair of tabs 410 with mounting holes 412 that are arranged to coincide with corresponding holes in the frame 220 (FIG. 2A) of a corresponding one of the electro-acoustic transducers 202. Mechanical fasteners can then be used to secure the transducers 202 and the first coupling members 232 to the baffle member 204 via the mounting holes 412. In the example illustrated in FIG. 4A, the wall 402 extends in a semi-circular pattern along the base 400. The first coupling member 232 may be formed of acrylonitrile butadiene styrene (ABS), polycarbonate (PC), or a polyphenylene ether (PPE)+polystyrene (PS) blend in a molding or machining process.

Figure 5A:
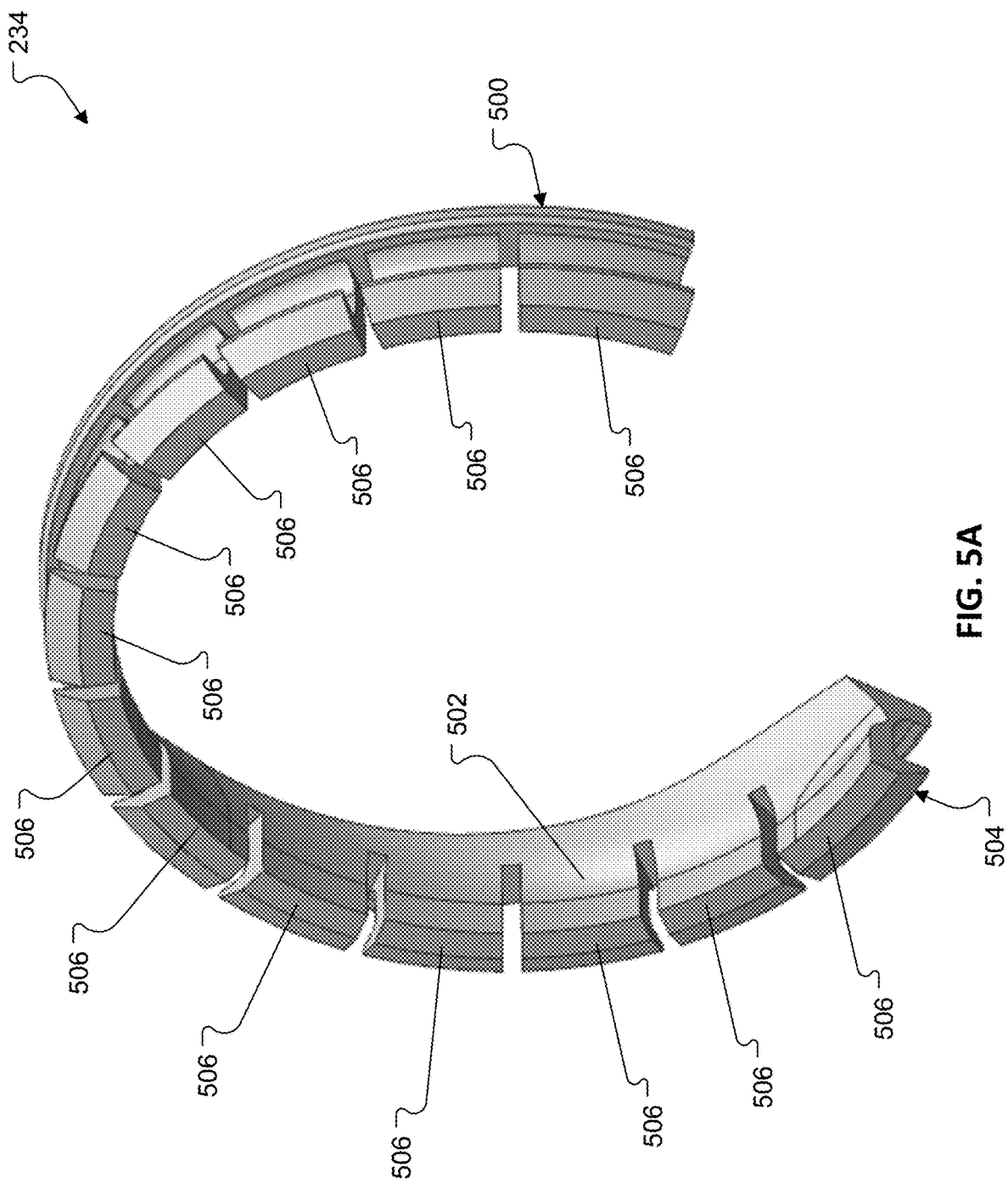
FIG. 5A is a perspective view of another coupling member from the vehicle headrest of FIG. 1A.
Figure 5B:
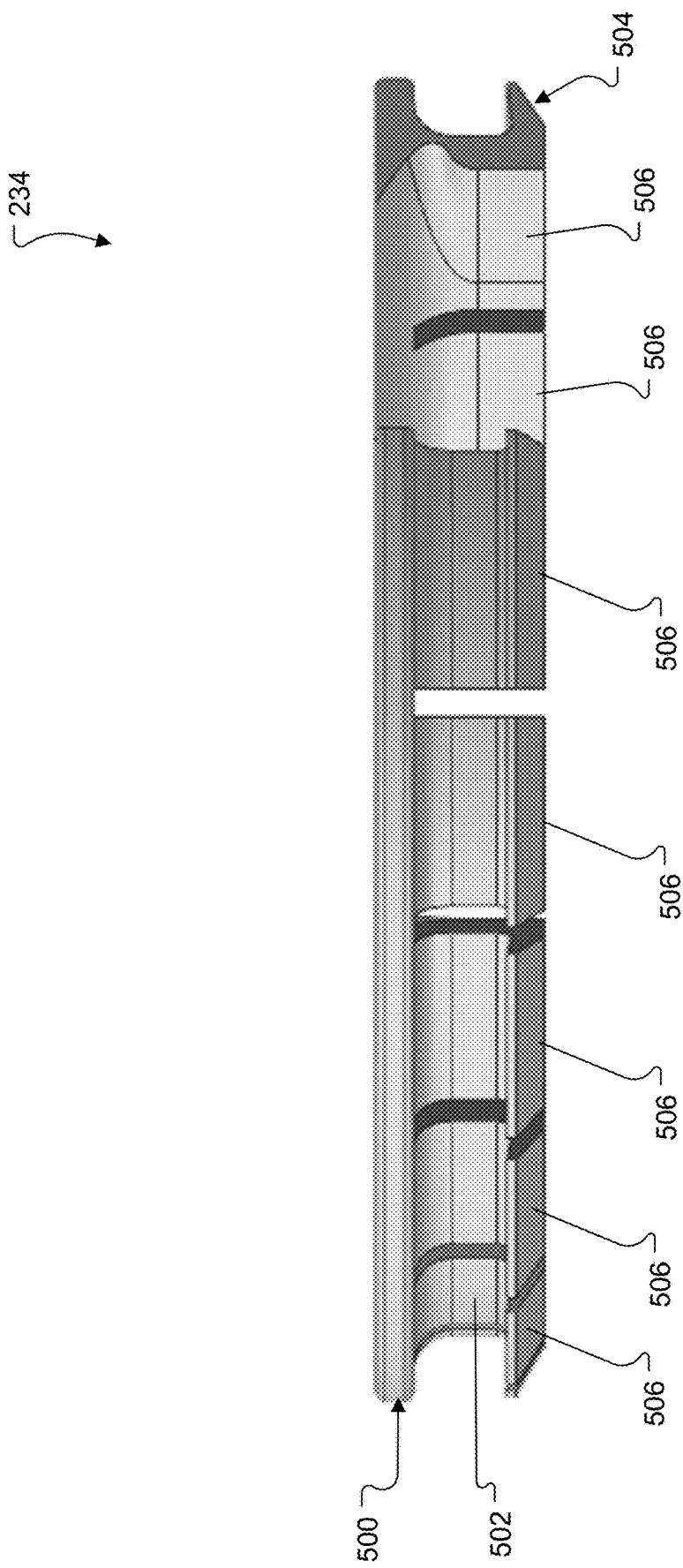
FIG. 5B is a side view of the coupling member of FIG. 5A.

Referring to FIGS. 5A & 5B, the second coupling member 234 includes a base 500 and a wall 502 that extends outwardly from the base 500. The wall 502 terminates at a hooked end 504 that is configured to engage the hooked end 406 of the first coupling member 232 so as to couple the first and second coupling members 232, 234 together. In the example illustrated in FIGS. 5A & 5B, the base 500 has a semi-circular shape and the wall 502 consists of a plurality of fingers 506 that extend upwardly from the semi-circular base 500 and terminate at respective hooked ends 504. The fingers 500 can allow the wall 502 to be more pliable which can make it easier to conform with and engage the mating features on the first coupling member 232. While a configuration with 13 fingers 506 is illustrated, other implementations may include more or fewer fingers. For example, some implementations may include a single continuous wall. The second coupling member 234 may be formed of polypropylene (PP), acrylonitrile butadiene styrene (ABS), polycarbonate (PC), or a polyphenylene ether (PPE)+polystyrene (PS) blend in a molding or machining process. If larger snap geometry can be used, more flexible materials, like elastomeric polyurethane (EPU) may be used as well. Still, other coupling methods for attaching the grill members to the baffle are contemplated.

Figure 6A:
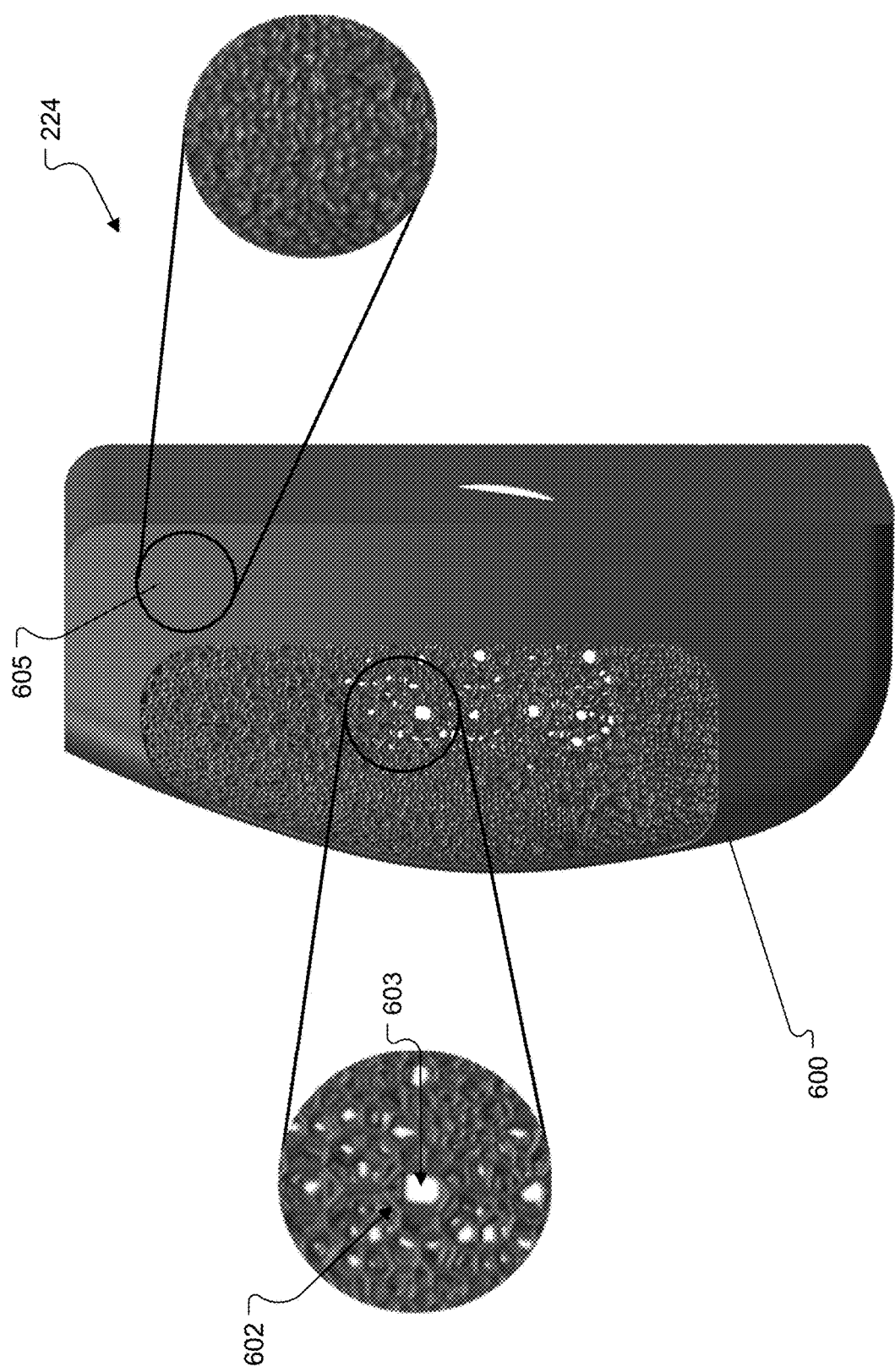
FIG. 6A is a front view of a grille member, showing details of a 3D printed lattice, from the vehicle headrest of FIG. 1A.
Figure 6B:
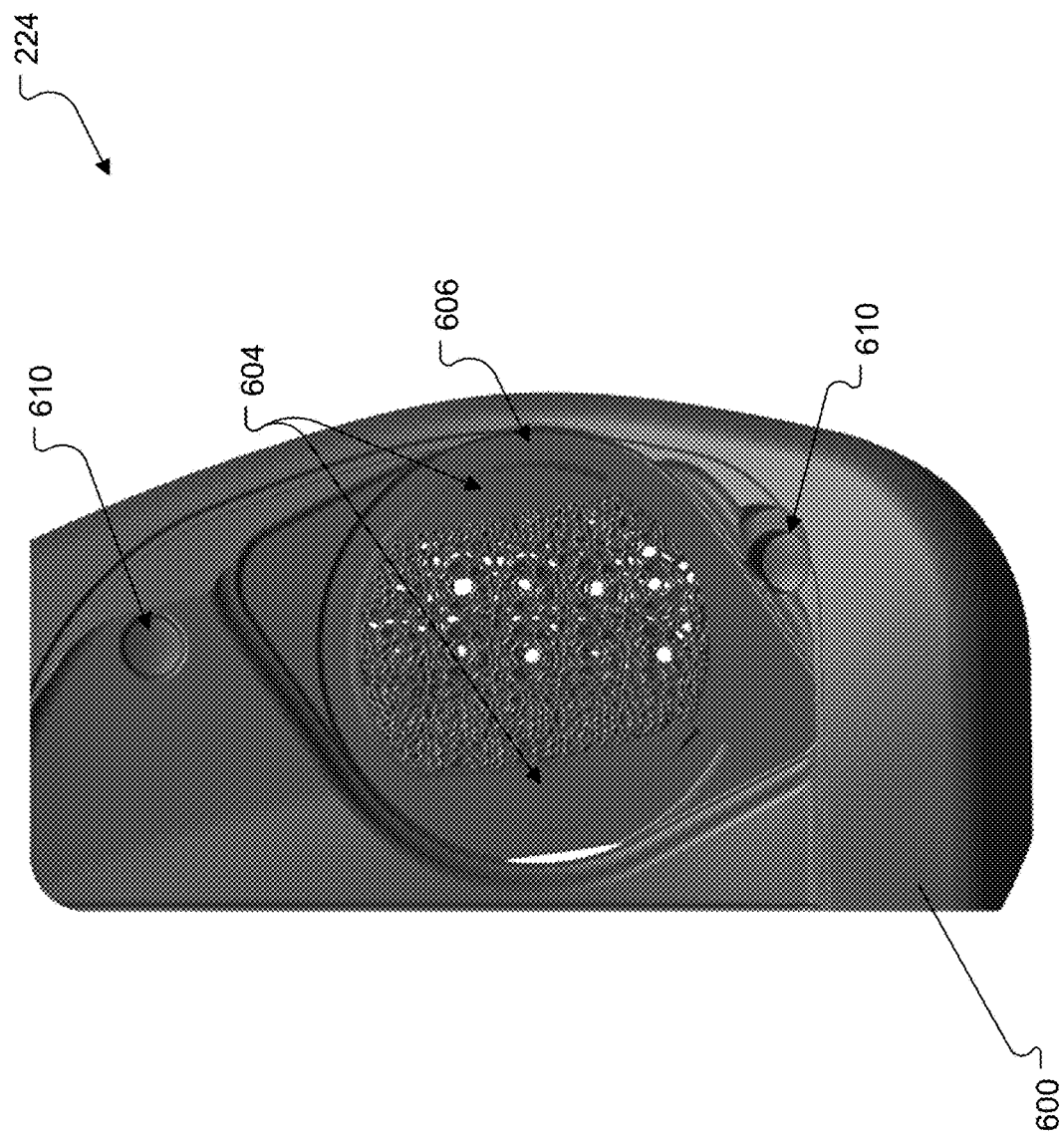
FIG. 6B is a rear view of the grille member of FIG. 6A.

Referring to FIGS. 6A & 6B, each of the grille members 224 includes a grille body 600. The grille body 600 is defined by a 3-Dimentional (3D) lattice consisting of a 3D grid of interconnected spokes 600 of polymer that define a network of open cells 602. The open cell structure allows regions of the grille bodies 600 to be acoustically transparent such that acoustic energy radiated from the front radiating surfaces of the electro-acoustic transducers 202 can pass through the overlying grille members 224. The individual spokes (a/k/a "rods") 600 may be formed from elastomeric polyurethane (EPU) to provide a material that is highly elastic, tear resistant, and resilient. The 3D lattice can be formed in a 3D printing process to achieve the desired shape of the grille body 600. It can be desirable to provide the grille body 600 with an outer surface that generally conforms to that of the cushion member 222 to provide a substantially continuous contour for supporting the user's head. The grille members 224 and the cushion member 222 together define a front surface 120 (FIG. 1A) of the headrest 100, against which the user's head rests during use.

Figure 7:
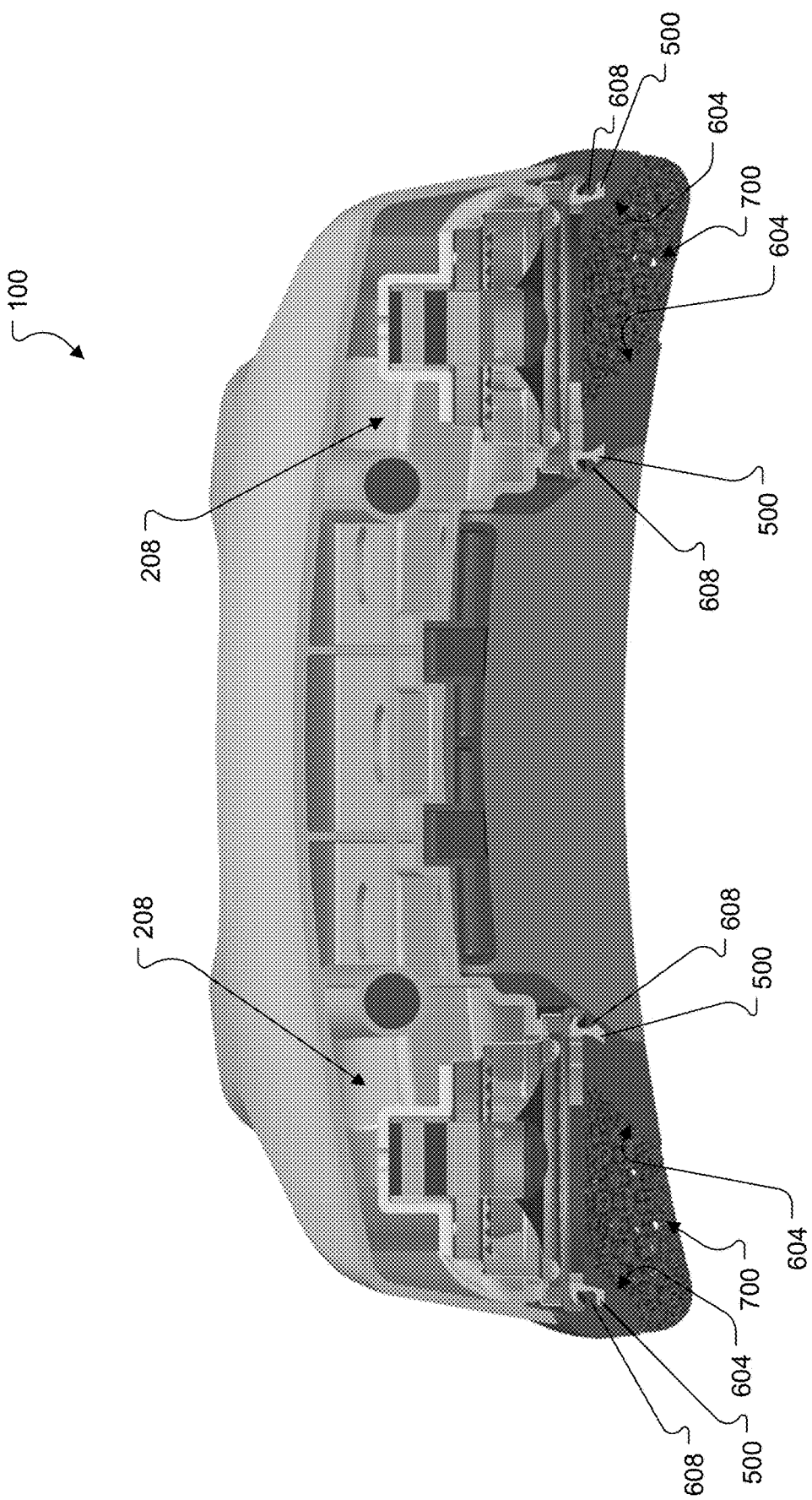
FIG. 7 is cross-sectional view of the vehicle headrest of FIG. 1A.

The use of 3D printing allows the lattice parameters such as unit cell type, shape, and spoke dimensions to be controlled to achieve the desired mechanical response, acoustic transparency, and manufacturability of the part. This can allow the grille body 600 to be tuned to have an energy absorption that meets automotive head restraint safety requirements, such as those mentioned above, and/or to have an energy absorption that closely matches that of the cushion member 222 at least in areas that are likely to come into contact with the user's head. The use of a 3D printing process to form the 3D lattice allows distribution of different mechanical properties within the same unitary part, enabling multiple functional zones. This also offers the potential to adapt the lattice design to acoustically mask certain areas 605, e.g., by reducing the dimensions of the open cells 602 in those areas. For example, the lattice geometry can be tuned in certain areas 604 (FIGS. 6B & 7) that lay adjacent the electro-acoustic transducers 202 to help define acoustic channels 700 (FIG. 7). Alternatively or additionally, all or part of the acoustic channels can be formed by a substantially continuous plane of material along a surface of the 3D lattice. Such a continuous, contoured plane (solid wall) can be formed integrally with the 3D lattice in a 3D printing process, or may be provided as a separate part, e.g., a contoured insert, that is secured to the 3D printed lattice. The acoustic channels 700 assist in diverting acoustic radiation from the front radiating surfaces of the electro-acoustic transducers toward desired directions.

In some cases, the acoustic channel can take advantage of a fixed acoustic or "core" design that can be used with different lattice configurations, which has the benefit of allowing the look, or profile, of the lattice to change without worry that the acoustics have changed. This can make more efficient development between different vehicles, customers, or even trim level differences.

The 3D printing process allows the 3D lattice to have a tunable load-compression profile, thereby enabling a breathable open-cell structure with a non-linear load compression profile which can be helpful to achieve a product that can be used comfortably across a broad set of users. This contrasts with open cell foams, which are breathable, but have substantially linear load compression profile (i.e., compression increases linearly with added load). Closed cell foams enable a more non-linear load compression response, but are not breathable and do not allow for the transmission of acoustic energy (i.e., closed cell foams are not acoustically transparent). The breathable open-cell structure of the 3D printed lattice enables the material to be acoustically transparent, such that acoustic energy can readily pass through the structure. Suitable 3D printing services, for printing 3D lattices, are available from Carbon, Inc., Redwood City, Calif.

Referring to FIG. 6B, the grille body 600 may define a recess 606 along its rear surface for receiving the base 500 (FIG. 5A) on the second coupling member 234. The recess 606 may be undersized to provide a compression fit with the base 500. The recess 606 may also incorporate a lip 608 (FIG. 7) to overlie the base 500 to help retain the second coupling member 234. Alternatively or additionally, all or part of the second coupling member 234 may be formed integrally with the grille body 600, e.g., in a 3D printing process.

In the illustrated example, the grille body 600 also defines a pair of recesses 610 for receiving Christmas tree fasteners (a/k/a push-in rivets, item 244, FIGS. 2A & 2B). The recesses 610 may be configured to receive and retain respective heads of the fasteners. The opposite ends of the fasteners 244 are pushed into apertures 266 (FIG. 2A) formed in the baffle member 204 to assist in securing the grille member 224 to the core assembly. The Christmas tree fasteners 244 help to ensure that a good acoustic seal is provided between the grille members 224 and the baffle member 204, and may help to ensure that the grille members 224 conform to the desired contour of the headrest 100.

While various implementations have been described above, other implementations are possible. For example, in some implementations, a cosmetic material layer may be wrapped over the grille members such that the 3D printed lattice provides the desired contour/profile and acoustic benefits, and the desired cosmetic appearance is achieved with different material.

Figure 8:
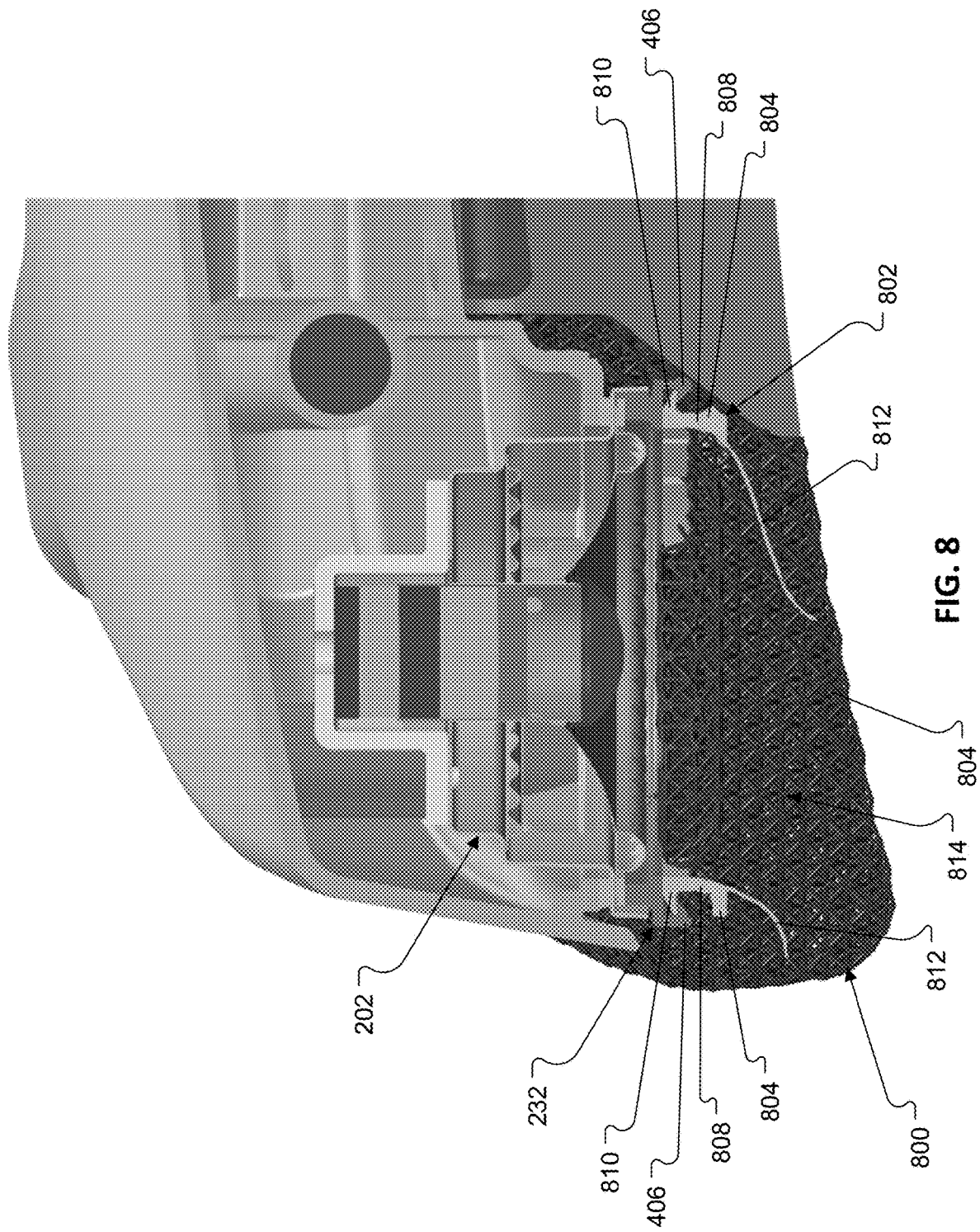
FIG. 8 is cross-sectional view of part of a vehicle headrest with an alternative grille member and coupling member configuration.

FIG. 8 illustrates another implementation of a grille member 800 and a second coupling member 802 that is configured to couple to the first coupling member 232 of FIGS. 4A & 4B. The grille member 800 includes a grille body 804 that is formed of a 3D printed lattice as described above. The coupling member 802 includes a base 806 and a sidewall 808 that extends upwardly from the base 806 and terminates at a hooked end 810. The hooked end 810 is configured to engage the hooked end 406 of the first coupling member 232. The sidewall 808 may be divided up into a plurality of fingers, such as described above with respect to implementation illustrated in FIGS. 5A & 5B. Notably, in the implementation illustrated in FIG. 8, the coupling member 802 also includes a wall(s) 812 which define(s) an acoustic channel 814 for diverting acoustic energy radiated from an associated one of the electro-acoustic transducers 202. The second coupling member 802 may be formed, e.g., molded, from polypropylene (PP), acrylonitrile butadiene styrene (ABS), polycarbonate (PC), or a polyphenylene ether (PPE)+polystyrene (PS) blend. The 3D printed lattice that forms the grille body 804 may be 3D printed around the second coupling member 802 such that the walls 812 are embedded within the 3D printed lattice.

Figure 9:
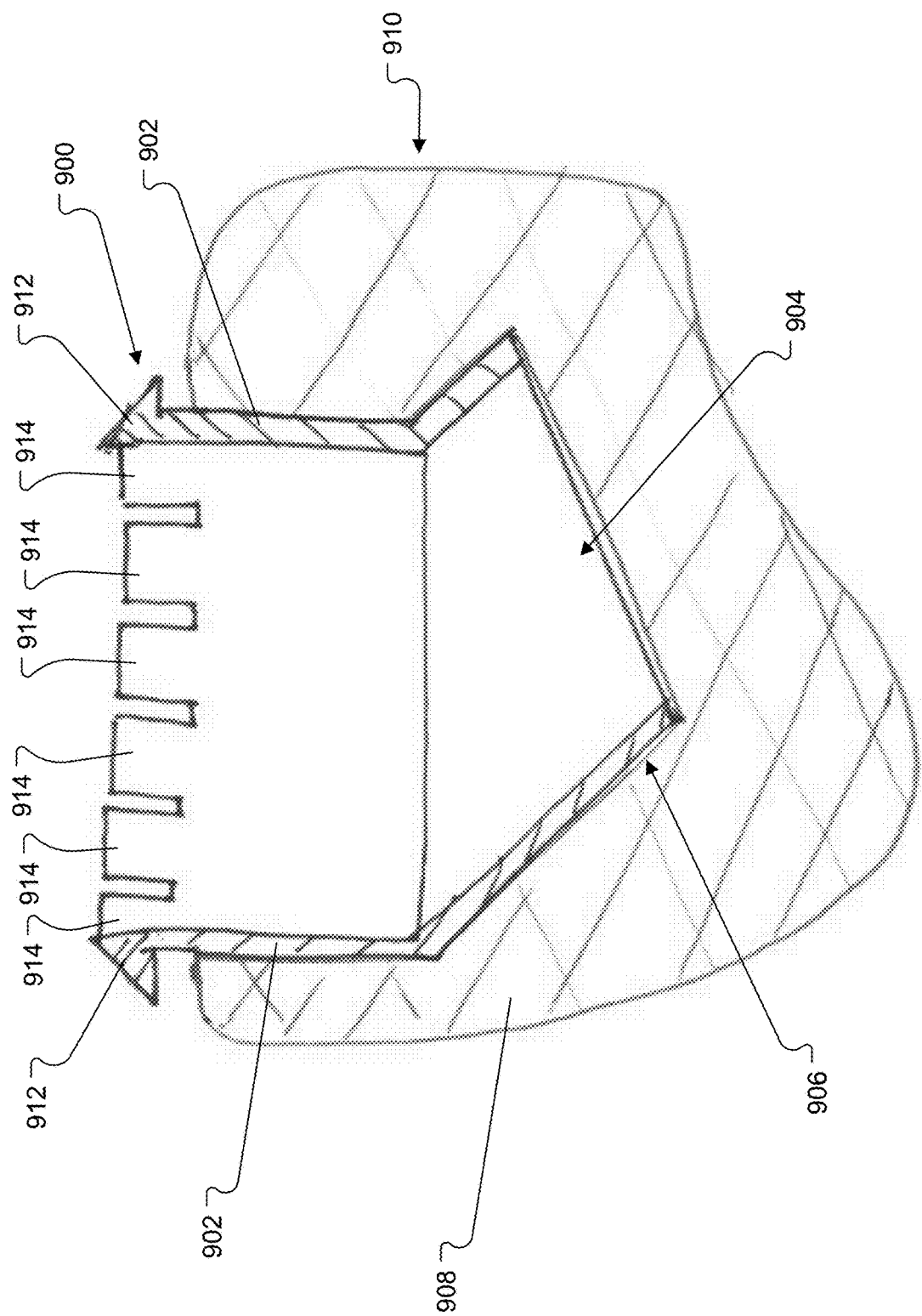
FIG. 9 is cross-sectional view of part of another alternative grille member and coupling member configuration.

Alternatively, as illustrated in FIG. 9, a second coupling member 900 can include a sidewall(s) 902 that defines an acoustic channel 904. The acoustic channel 904 is received in a recess 906 formed in a 3D printed lattice that forms a grille body 908 of a grille member 910. The second coupling member 900 is retained in the recess 906 via an interference fit. Alternatively or additionally, an adhesive may be used to secure the sidewall 902 to the 3D printed lattice. A protruding portion of the sidewall(s) 902 includes a hooked end 912. The hooked end 912 is configured to engage the hooked end 406 (FIG. 4A) of the first coupling member 232 to secure the grille member 910 to the baffle member 204 (FIG. 2A). The hooked end 912 of the sidewall 902 may be divided up into a plurality of fingers 914 allowing the hooked end 912 of the sidewall 902 to be more pliable to make it easier to conform with and engage the mating features on the first coupling member 232

Figure 10:
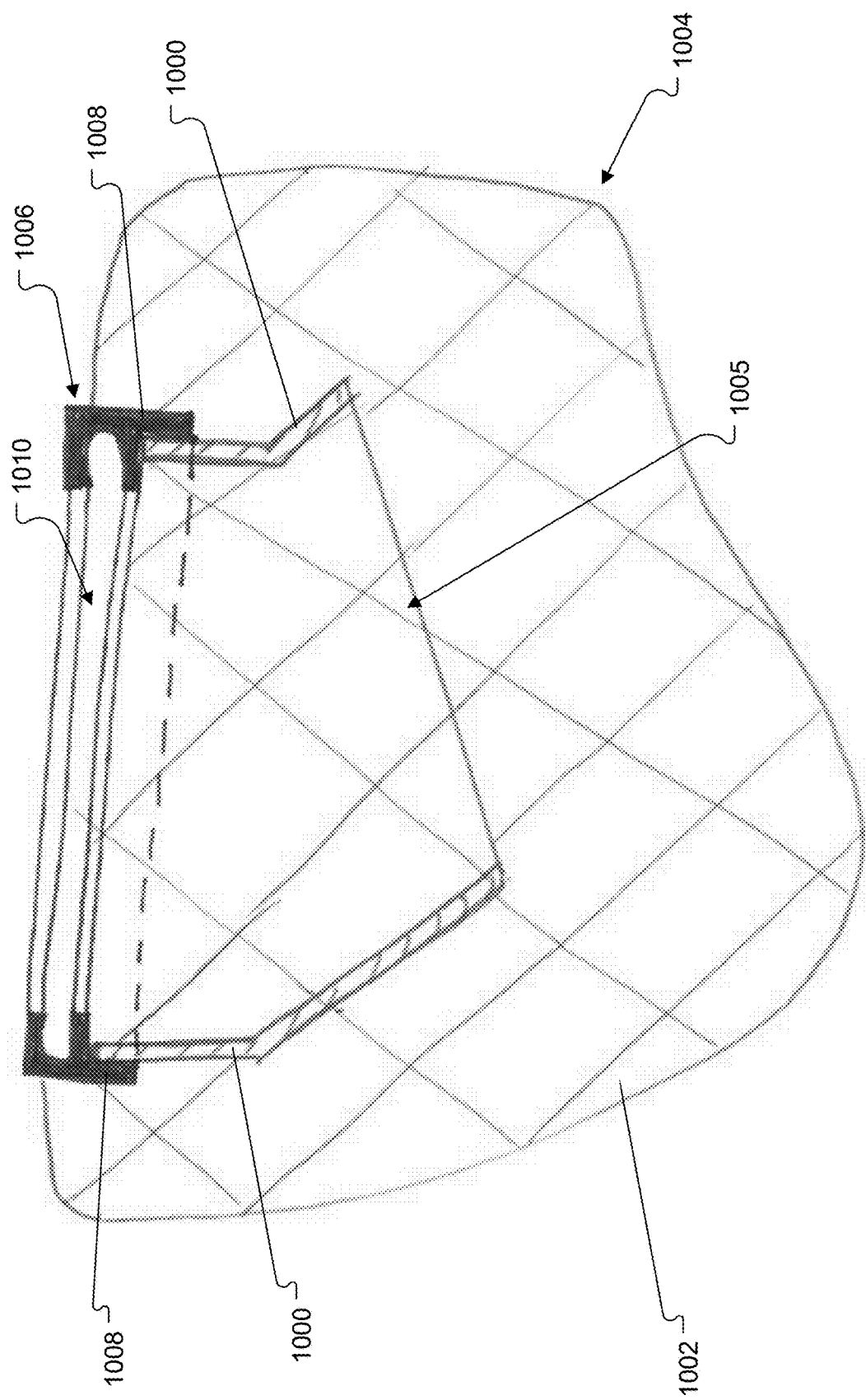
FIG. 10 is cross-sectional view of part of yet another alternative grille member and coupling member configuration.

In yet another implementation, illustrated in FIG. 10, one or more sidewalls 1000 may be printed directed into a 3D printed lattice that forms a grille body 1002 of a grille member 1004. The sidewalls 1000 can be printed at the same time as the 3D printed lattice, e.g., from the same material, and, thus, may be integral to the lattice. The sidewalls 1000 provide a continuous, contoured plane that closes off the open cells in regions of the 3D printed lattice, thereby to form an acoustic channel 1005 that assists in directing acoustic energy radiated from an associated one of the electro-acoustic transducers 202 (FIG. 2A) in a desired direction. The implementation illustrated in FIG. 10 also includes a retention member 1006. The retention member 1006 includes a wall 1008 (e.g., a circular or semi-circular wall) about which the grille body 1002 is printed, thereby embedding the retention member 1006 at least partially within the 3D printed lattice of the grille body 1002. In the illustrated example, the retention member 1006 is directly adjacent the acoustic channel 1005. The retention member 1006 also includes a recess 1010 (e.g., an annular or semi-annular recess) for receiving the base 500 of the second coupling member 234 of FIG. 5A, thereby to couple the second coupling member 234 to the grille member 1004. In some instance the grille body 1002 and the retention member 1006 could be formed from the same printed material.

A number of implementations have been described. Nevertheless, it will be understood that additional modifications may be made without departing from the scope of the inventive concepts described herein, and, accordingly, other implementations are within the scope of the following claims.

What is claimed is:
1. A vehicle headrest comprising:
an electro-acoustic transducer;
an acoustic enclosure defining an acoustic chamber, the acoustic enclosure including a baffle member that supports the electro-acoustic transducer such that a rear radiating surface of the electro-acoustic transducer radiates acoustic energy into the acoustic chamber, wherein the baffle member includes a plurality of recesses;
a cushion member coupled to the acoustic enclosure for supporting a user's head, wherein the cushion member includes a mounting member comprising a plurality of features for engaging the plurality of recesses in the baffle member, thereby to couple the cushion member to the baffle;
a grille member overlying a front radiating surface of the electro-acoustic transducer, the grille member comprising a 3D printed lattice; and a first coupling member supported by the grille member for coupling the grille member to the acoustic enclosure, wherein at least one of (a) the 3D printed lattice defines a recess for receiving the coupling member or (b) the first coupling member is formed integrally with the 3D printed lattice.

2. The vehicle headrest of claim 1, wherein the acoustic enclosure comprises: a rear cover that defines a rear surface of the headrest.

3. The vehicle headrest of claim 1, wherein the cushion member comprises: a cushion layer for supporting a user's head.

4. The vehicle headrest of claim 1, wherein the 3D printed lattice has a non-linear load-compression profile.

5. The vehicle headrest of claim 1, wherein the 3D printed lattice has a lattice geometry that is tuned to acoustically mask certain areas of the grille member.

6. The vehicle headrest of claim 5, wherein the 3D printed lattice has a lattice geometry that at least partially defines an acoustic channel in the grille member.

7. The vehicle headrest of claim 1, further comprising an acoustic channel coupled to the grille member, wherein the acoustic channel is defined, at least in part, by a continuous, contoured plane that is formed integrally with the 3D printed lattice in a 3D printing process.

8. The vehicle headrest of claim 1, wherein the 3D printed lattice has a lattice geometry that is tuned to have an energy absorption that is substantially the same as that of the cushion member.

9. The vehicle headrest of claim 1, further comprising a second coupling member supported by the acoustic enclosure for engaging the first coupling member, thereby to couple the grille member to the acoustic enclosure.

10. The vehicle headrest of claim 9, wherein the first and second coupling members include hooks that interlock to couple the first and second coupling members to each other.

11. The vehicle headrest of claim 1, wherein the first coupling member is a Christmas tree fastener, the 3D lattice defines a recess for receiving a first end of the Christmas tree fastener; and the acoustic enclosure defines an aperture for receiving a second, opposite end of the Christmas tree fastener, thereby to couple the grille member to the acoustic enclosure.

12. The vehicle headrest of claim 1, further comprising a support rod coupled to the acoustic enclosure for securing the headrest to a seatback.

13. The vehicle headrest of claim 1, wherein the grille member is disposed adjacent the cushion member such that the grille member and cushion member together define a front surface contour of the headrest.

14. A loudspeaker comprising:

an electro-acoustic transducer;

an acoustic enclosure defining an acoustic chamber, the acoustic enclosure including a baffle member that supports the electro-acoustic transducer such that, during operation, a rear radiating surface of the electro-acoustic transducer radiated acoustic energy into the acoustic chamber, wherein the baffle member includes a plurality of recesses configured to engage with a plurality of features associated with a cushion member for supporting a user's head;

a grille member overlying a front radiating surface of the electro-acoustic transducer, the grille member comprising a 3D printed lattice; and a first coupling member supported by the grille member for coupling the grille member to the acoustic enclosure, wherein at least one of (a) the 3D printed lattice defines a recess for receiving the first coupling member and (b) the first coupling member is formed integrally with the 3D printed lattice.

15. The loudspeaker of claim 14, further comprising an acoustic channel, wherein the 3D printed lattice at least partially defines the acoustic channel for diverting acoustic radiation from the front radiating surface of the electro-acoustic transducer toward a desired direction.

16. The loudspeaker of claim 14, wherein the 3D printed lattice is formed of elastomeric polyurethane.

17. The loudspeaker of claim 14, wherein the 3D printed lattice comprises a 3D grid of interconnected spokes of polymer that define a network of open cells.

18. The loudspeaker of claim 14, wherein the 3D printed lattice has a non-linear load-compression profile.

19. The loudspeaker of claim 14, wherein the 3D printed lattice has a lattice geometry that is tuned to acoustically mask certain areas of the grille member.

20. The loudspeaker of claim 19, wherein the 3D printed lattice has a lattice geometry that at least partially defines an acoustic channel in the grille member.

* * * * *